(12) United States Patent
Toeller

(10) Patent No.: US 6,701,463 B1
(45) Date of Patent: Mar. 2, 2004

(54) HOST SPECIFIC MONITOR SCRIPT FOR NETWORKED COMPUTER CLUSTERS

(75) Inventor: Thomas J. Toeller, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 426 days.

(21) Appl. No.: 09/655,334

(22) Filed: Sep. 5, 2000

(51) Int. Cl.[7] .................. G06F 11/00; G06F 15/173; G06F 9/44
(52) U.S. Cl. .................. 714/47; 714/38; 709/223; 709/224; 717/124; 717/127
(58) Field of Search ............... 714/38, 47; 709/223, 709/224; 717/124, 127

(56) References Cited

U.S. PATENT DOCUMENTS

| | | | | |
|---|---|---|---|---|
| 5,793,977 A | * | 8/1998 | Schmidt | 709/224 |
| 5,983,316 A | * | 11/1999 | Norwood | 711/112 |
| 6,088,727 A | * | 7/2000 | Hosokawa et al. | 709/223 |
| 6,393,485 B1 | * | 5/2002 | Chao et al. | 709/231 |
| 6,421,737 B1 | * | 7/2002 | Stone et al. | 709/318 |

* cited by examiner

Primary Examiner—Robert Beausoliel
Assistant Examiner—Emerson Puente
(74) Attorney, Agent, or Firm—Scott M. Garrett

(57) ABSTRACT

A monitoring subroutine is embedded within a package that provides no other client services other than the monitoring functionality itself. Because of this, the monitoring package can be shut down at any time without affecting any other system services or packages. The inventive concept is realized by providing one monitor package for each type of package running on a server; the one monitor package running on the same server. Also, this invention provides a communication mechanism between the monitoring subroutine and the packages whose services are being monitored. This is necessary to provide the monitoring subroutine a real time view of the resources being provided by all of the packages as a whole. To accomplish this, a state table is provided for all packages of the same type running or pending on a given node and similar monitor state tables are provided for other nodes. In this implementation, the standard packages just make one-time changes to the system resources. They make a change in the state table when they start, and undo it when they stop; once again, adjusting the state table, so a monitor program knows what the current state of resources, packages and nodes should be. The monitor subroutine embedded in a monitoring package loops indefinitely and constantly checks the real state of resources against the state table. Now, if any of the system resources fail then the monitor package restarts the failed system resource and restores it to its "last known use" state without stopping and re-starting any of the packages on that server that were using that system resource.

19 Claims, 6 Drawing Sheets

HOST SPECIFIC MONITOR SCRIPT FOR NETWORKED COMPUTER CLUSTERS

FIELD OF THE INVENTION

This invention generally relates to embedded software packages in distributed computer systems and more particularly to an improved system and method for system recovery and migration of services in the event of a failure.

BACKGROUND OF THE INVENTION

Distributed computer systems store enormous amounts of information that can be accessed by users for identification and retrieval of valuable documents that contain control, data, text, audio and video information. A typical example of a distributed system (100) is shown in FIG. 1. A distributed computer system consists of computer nodes (104a to 104n and 108a to 108z) and a communication network (102) that allows the exchange of messages between computer nodes. The communication network (102) may be any of the following: a local area network (LAN), a wide area network (WAN), a corporate intranet, the Internet, a wireless network, a cabling network or equivalents. Multiple storage devices (106a to 106n and 110a to 110z) store data files for the multiple nodes of the distributed system. Storage devices (106a to 106n) are local storage for the nodes (104a to 104n); storage devices (110a to 110z) are global databases which are accessible by nodes (108a to 108z); these are considered to belong to a storage or disk "farm" (112) of shared non-volatile memory. These nodes work together to achieve a common goal (e.g., a parallel scientific computation, a distributed database, control of multiple robots in a manufacturing plant or a parallel file system). In particular, nodes (108a to 108z) act as control servers in a manufacturing plant; they control and communicate with local nodes (104a to 104n) in order to effect control of an industrial process or device. Such devices, which are not shown in FIG. 1, include robots, printers, video devices, audio devices, tape devices, storage devices or their equivalents.

FIG. 2 (200) illustrates the composition of a processing server node (202) utilized by some distributed processing node implementations. As shown, the node (202) contains a software package (204a) that effects control and communication with the devices mentioned above. Further, package (204a) comprises other services (208a) and an embedded monitor software subroutine (206a). Other services (208a) are the part of the package (204a) that performs device communication and control. Monitor subroutine (206a) monitors the functionalities of the package (204a). The package (204b) as shown in an expanded diagram includes other services (208b) that typically executes:

Mount/home1

Export (share)/home1

Service File I/O Requests for/home1

Start Monitor and a monitor subroutine (206b) that typically executes monitoring functions including:

Periodically Verifying I/O Daemon Responsiveness

If necessary, Restarting Daemons and Re-Export/home1

However, a problem arises in that this embedded monitor subroutine (206a), because it is embedded in the package it is monitoring, has no knowledge of other packages. So, if there is a package running on each node of a multiple node cluster, and one node fails, its package must move to another node. If both of these packages contained embedded monitors that were monitoring the respective packages, and a problem occurred that required corrective action, they would compete against each other by trying to restart resources. For example, whichever starts a recovery process first would attempt to restart some process. This process restart in turn is detected by a second monitor as a failure since the state of the first package and monitor is unknown to the second monitor. Thus, the second monitor would now attempt to restart its process and the errors would accrue successively.

A typical processing node cluster software that uses this implementation is Hewlett Packard's (Palo Alto, Calif.) MC/ServiceGuard. In this software, the whole purpose of the packages is to form a collection of services that can move from one host or machine to another. This migration of services can be precipitated by a total nodal failure (i.e., an equipment failure like a node caught on fire), the result of planned maintenance on one of the nodes or for the purpose of load balancing. The services contained within the nodes are grouped into packages as previously described; a given package is any combination of programs or data. Although service migration occurs for some failures, not all failures actually necessitate a migration of services; rather, a program which has died may be restarted by an automated watchdog process for example. A package monitoring program automatically performs this watchdog process in the Hewlett Packard implementation; there, the monitor is launched by the package it intends to monitor.

In addition, the cluster software is controlled by an operating system containing a network file system (nfs, SUN Microsystems, Palo Alto, Calif.). This network file system comprises a plurality of processes including, but not limited to: a) nfsd, "nfs daemon", b) rpc mountd, "remote procedure call mount daemon", and c) rpc statd, "remote procedure call status daemon". These are all part of the operating system that allows "nfs" (SUN's network file system) to work. These processes are the ones that are monitored for a file sharing package. However, it is understood that the monitored processes are anything that is required for a given package to perform its functionality.

The above architecture present two major problems, namely, a) the monitor can't be terminated without stopping the package it is monitoring, and b) only one package with similar attributes can be running at any given time on a node. First, if there are any adjustments required in the monitor itself (timing issues, retries or the equivalent) the client services provided by the package running the monitor must be interrupted. Because the goal of MC/ServiceGuard is to provide high availability for server resources, stopping a package even for a short period of time is undesirable. Second, if there were two or more packages running with similar attributes each of these could affect processes that the other is watching. As a result, an endless loop of erroneous attempts at some corrective action prevents one server from taking over the resources of another server. Prior attempts to resolve this problem include maintaining a normally idle standby server or dedicating a functionality to a specific server. However, neither of these choices is cost effective nor permits distributed dissemination of packages. What is needed is a hardware or software implementation that solves the problems of: a) that the monitor can't be updated since it can't be terminated without stopping the package it is monitoring, and b) only one package with similar attributes can be running at any given time on a node.

BRIEF DESCRIPTION OF THE FIGURES

The features of the invention believed to be novel are set forth in the claims. The invention itself, however, may be best understood by reference to the following detailed description of certain exemplary embodiments of the invention, taken in conjunction with the accompanying drawings in which:

DETAILED DESCRIPTION OF THE PREFERRED EMBODIMENTS

Figure 1:
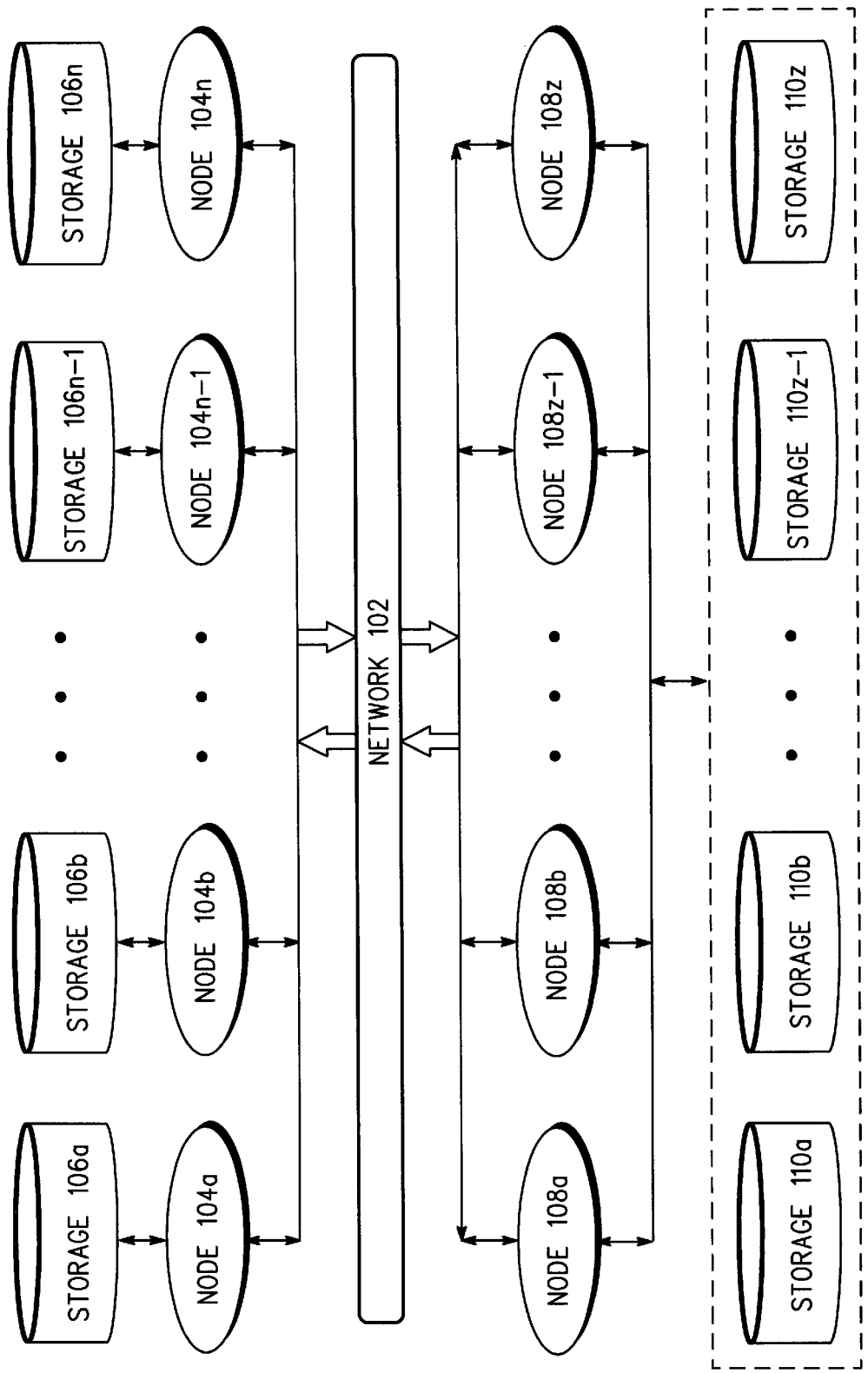
FIG. 1 is a system level overview (100) of a typical prior art distributed database processing network within which the present invention may be practiced.
Figure 2:
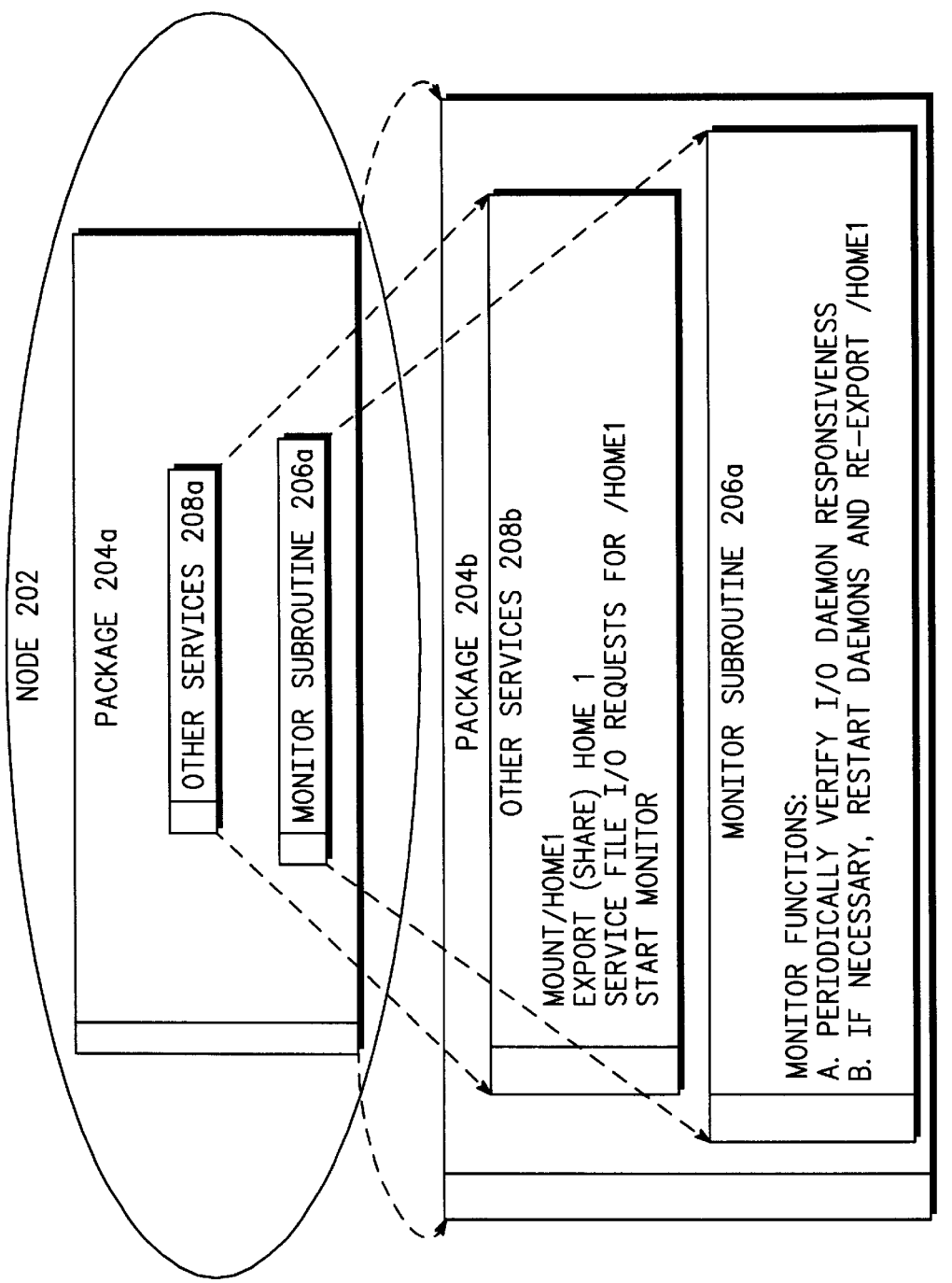
FIG. 2 (200) is a typical server node (202) illustrating the prior art practice of inserting an embedded monitor subroutine into a package with other services.

While this invention is susceptible of embodiment in many different forms, there are shown in the drawings and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. In the description below, like reference numbers are used to describe the same, similar, or corresponding parts in the several views of the drawings.

Preferred Embodiment

Figure 3:
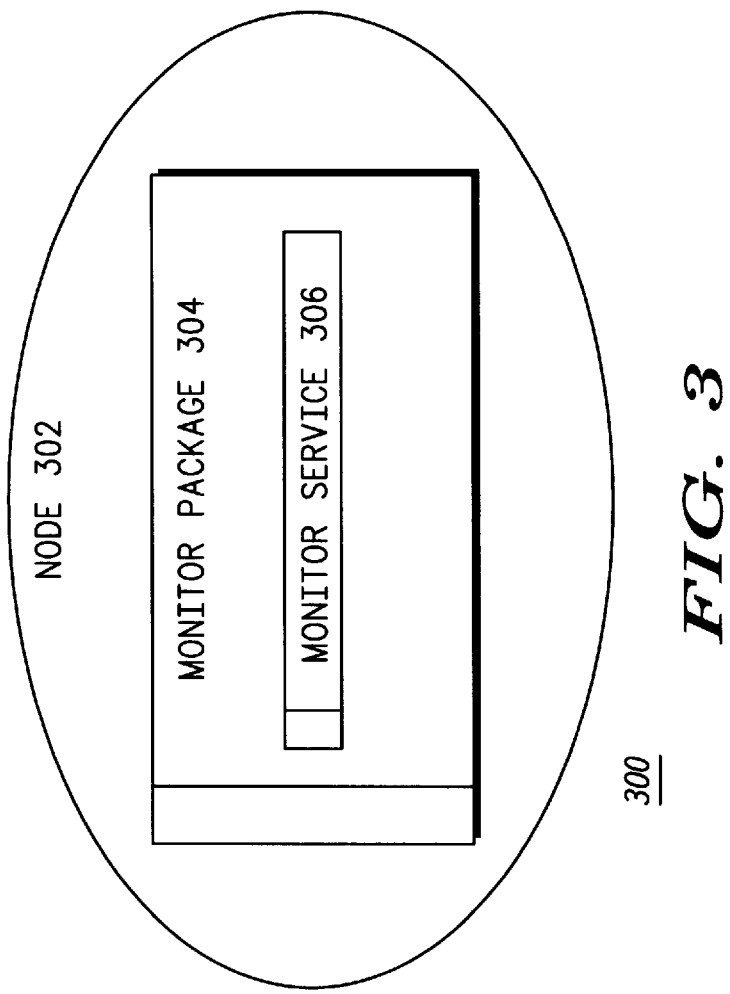
FIG. 3 (300) is a server node (302) illustrating a dedicated monitoring package (304) containing a monitoring service (306).

Monitor Subroutine Embedded within a Dedicated Monitor Package on a Server Node In a first embodiment, this invention solves the aforementioned problems by introducing a new manner of embedding the monitoring package. The monitoring subroutine is embedded within a package that provides no other client services other than the monitoring functionality itself. In other words, the package that contains the monitoring subroutine is a monitor package. Because of this, the monitoring package can be shut down at any time without affecting any other system services or packages. As a result, client nodes or machines will experience no interference or service stoppage. FIG. 3 (300) is a server node (302) illustrating a dedicated monitoring package (304) containing a monitoring service (306). Although only a single type of monitoring package (304) is shown, there are many packages present on the server node. The inventive concept is realized by providing one monitor package for each type of package running on a server; in other words, one node has one monitor package for a certain type of package even if there are many packages of that certain type running on that node.

Further, the monitoring service attempts to communicate with a plurality of processes at predetermined intervals. In the case of a failure to communicate with one of these processes, a predetermined number of retrials are executed. After the retrials have expired, an attempt to automatically restart the process is made. If any of these predetermined timers or actions proves to be to sensitive, or to invasive, (i.e. the cure turns out to be worse than the disease), the monitoring service and package is shut down and adjusted; all of this occurs without affecting file sharing to the clients.

An Alternative Preferred Embodiment

Monitor Subroutine Using a Shared Table Mechanism for Facilitating the Monitoring Process In another embodiment, this invention provides a communication mechanism between the monitoring subroutine and the packages whose services are being monitored. This is necessary to provide the monitoring subroutine a real time view of the resources being provided by all of the packages as a whole.

To accomplish this, a state table is provided for all packages of the same type running or pending on a given node and similar monitor state tables are provided for other nodes; the common monitor state tables are stored in the non-volatile disk farm or are stored in volatile random access memory (RAM). These only reflect the state of one node, so they do not need to be shared between nodes. In this implementation, the standard (non-monitor) packages just make one-time changes to the system resources. They make a change in the state table when they start, and undo it when they stop; they adjust the state table so that a monitor program knows what the current state of resources, packages and nodes should be. The monitor subroutine embedded in a monitoring package loops indefinitely and constantly checks the real state of resources against the state table. Now, if any of the system resources fail, then the monitor package restarts the failed system resource and restores it to its "last known use" state without stopping and re-starting any of the packages on that server that were using that system resource.

Figure 4:
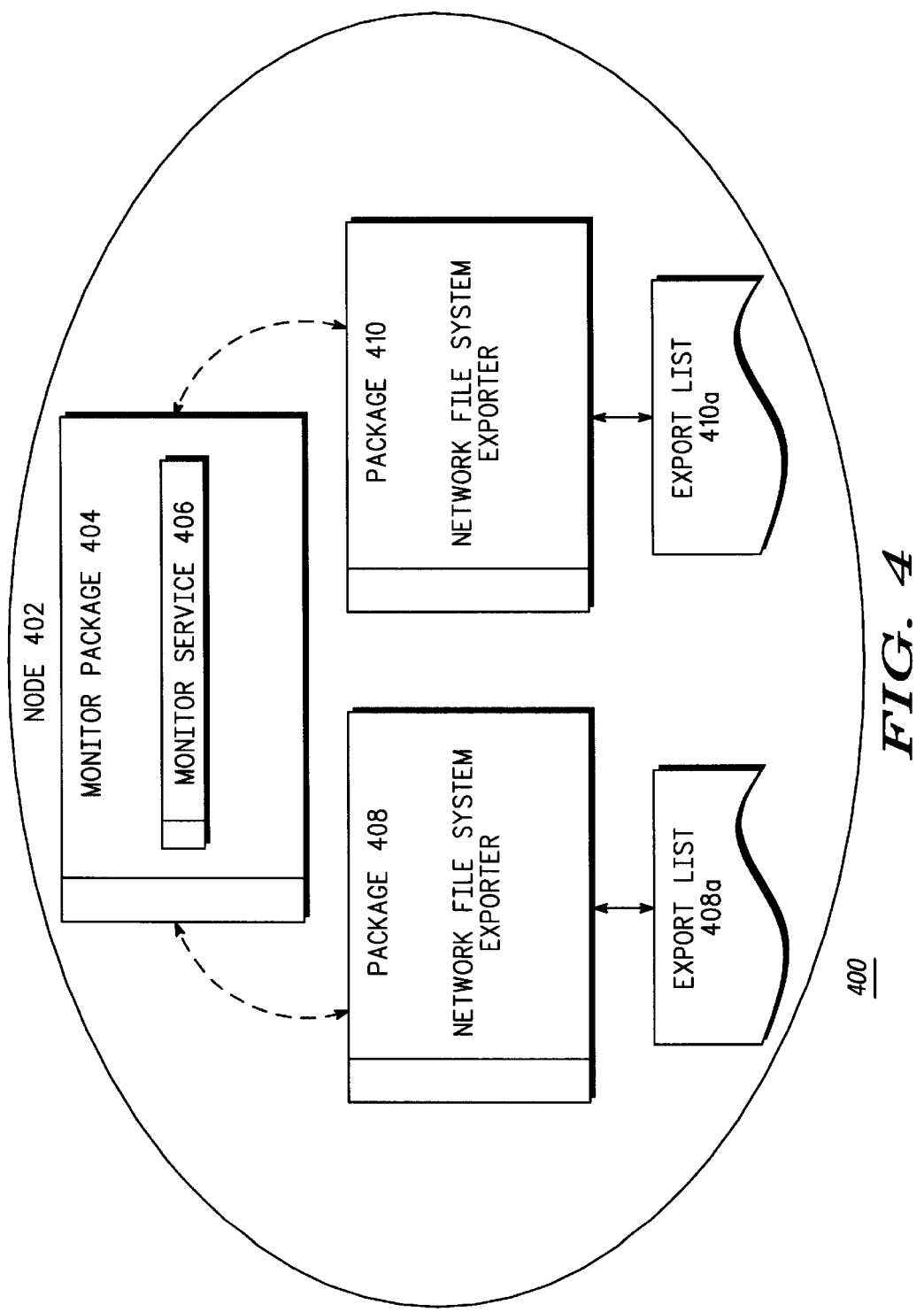
FIG. 4 is a block diagram (400) that illustrates a server node (402) including a monitoring package (404) and service packages (408, 410) including export lists (408a, 410a) for the respective service packages.

FIG. 4 is a block diagram (400) that illustrates a server node (402) including a monitoring subroutine (406) embedded within a dedicated monitoring package (404) and service packages (408, 410) including export lists (408a, 410a) for the respective service packages. To accomplish the monitoring function, this invention provides a communication mechanism between the monitoring subroutine and the packages whose services are being monitored. This is necessary to provide the monitoring subroutine a real time view of the resources being provided by all of the packages as a whole. For example, if there are two packages (408, 410) providing nfs exported file systems, each will have a different list of what to export. If the monitor program is tracking the mountd daemon and needs to restart it, all the file systems which were previously exported must be exported again. To do this, the monitor must know which packages are running and which file systems to export for each. This communication can take any of several forms including: shared files, shared memory interprocess communication or their equivalents; the only requirements for these communication forms is that the monitoring service and packages must be configured to use the same method and that a locking mechanism be in place to maintain data consistency.

Figure 5:
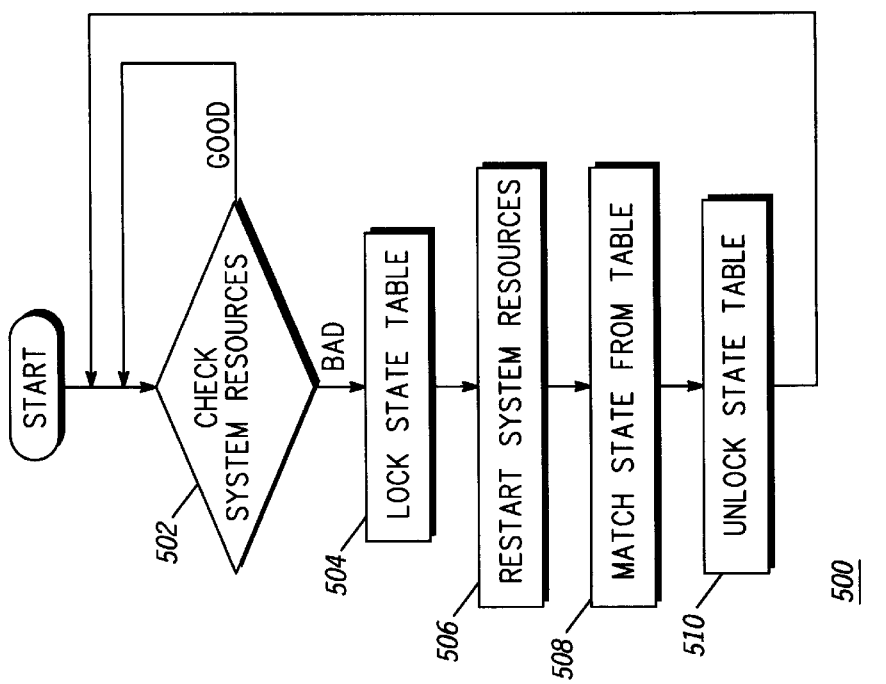
FIG. 5 is a flow diagram (500) that illustrates a functional overview of a Monitor Subroutine as practiced by this invention.

FIG. 5 is a flow diagram (500) that illustrates a functional overview of a Monitor Subroutine as practiced by this invention. In particular, the monitor package checks the "last known use" state (502) and related parameters that were stored in the common monitor state table for a plurality of system resources (i.e., stored by any of the packages of the same type on that server that were using that system resource before it failed). If the system resources are found to be operational, then the monitoring service will continue to check the state of the system resources indefinitely until a failure occurs. However, if a system resource fails then the monitoring service detects that fact and begins the recovery attempt. The State Table is locked (504) so that no changes can be made to it while the resource is being restored. The monitor package then restores the sys resource (506) to the "last known use" (508) state without having to stop and restart any of the packages of the same type that were using the sys resource. Finally, the State Table is unlocked making it accessible to other packages (510).

Figure 6:
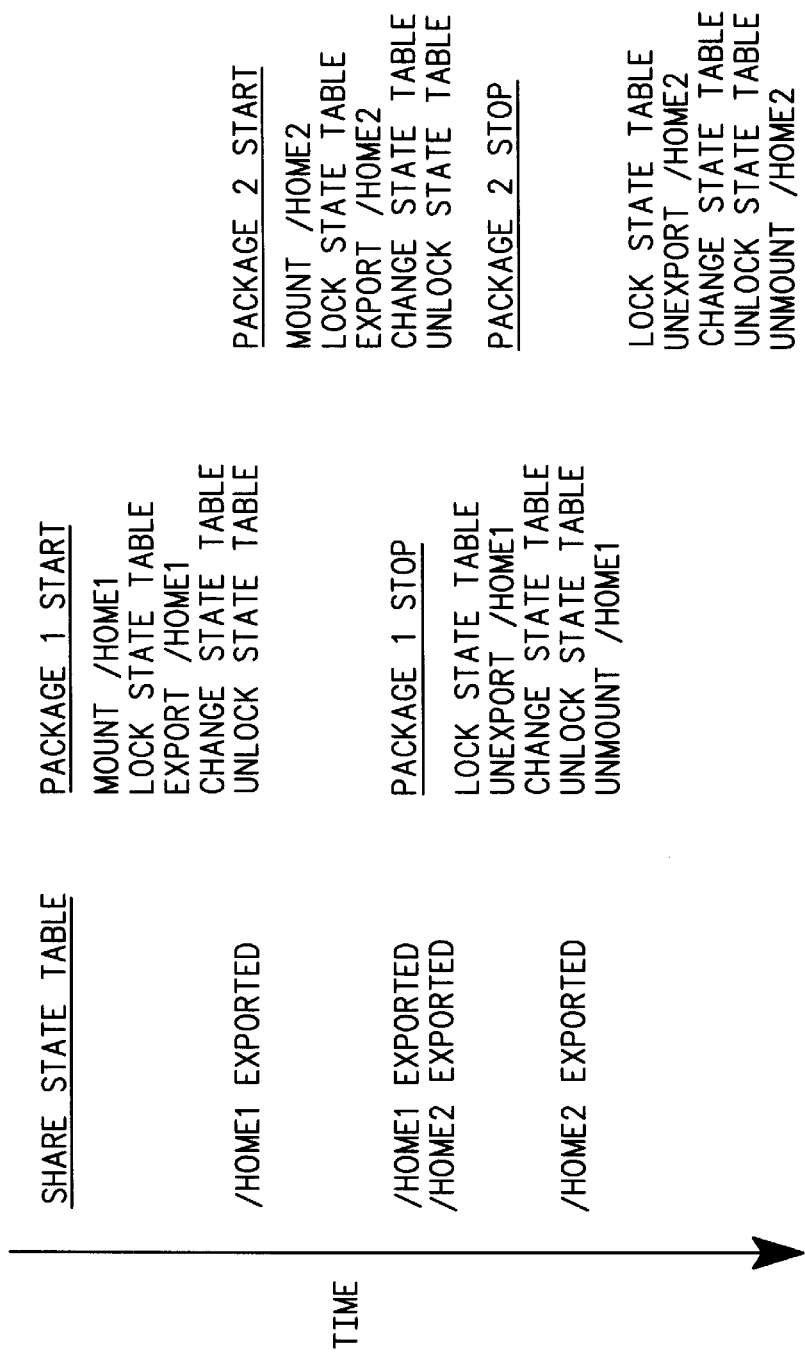
FIG. 6 is a diagram that shows Packages writing to the Shared State Table and illustrates the contents of the Shared State Table used by two packages.

Packages write to the Shared State Table as shown in FIG. 6 that illustrates the contents of the Shared State Table used by two packages. Package 1 first locks the Shared State Table so that it writes to the Shared Table exports /home1. Notice that the Shared State Table now contains /home1 exported. Subsequently, the Shared State Table is unlocked for access by other packages. Then, Package 2 first locks the Shared State Table so that it writes to the Shared Table exports /home2. Notice that the Shared State Table now contains/home 1 as well as /home2 exported. Subsequently, the Shared State Table is unlocked for access by other packages. Next, when the state of Package 1 has changed the state of Package 1 in the Shared State Table must also change. Therefore, Package 1 locks the Shared State Table un-exports/home1, changes the State Table and unlocks the Shared State Table for further activity by other packages. Now the Shared State Table only contains/home2 exported since/home1 was un-exported. Then, when the state of Package 2 has changed the state of Package 2 in the Shared State Table must also change. Therefore, Package 2 locks the Shared State Table un-exports/home2, changes the State Table and unlocks the Shared State Table for further activity by other packages. Now the Shared State Table is empty since both /home2 and /home1 were un-exported.

In this way, the packages "continue" to use the sys resource without becoming aware that the sys resource failed and then returned to normal operation. In the new scenario, all packages of the same type (in this case, nfs file sharing) use a common state table to track changes they have made. The most commonly used package type in this example is a file sharing package (nfs); in the UNIX world, this equates to exporting file systems via nfs. The reason for multiple file sharing packages on the same node is to provide a smaller granularity for load balancing the nodes in a given "cluster". Of course even if there were only one package per node in normal operation, the purpose of the cluster is to allow a package to move from a failed node to an active one. If this happens, you end up with at least two packages on the same node.

Now it is possible to have a monitor package (one per package type/per server) that can recover the system resources used by all other packages of that type. Since it is not tied directly to any other package, the monitoring service can be started or stopped without interrupting service. Also, since the monitoring package determines the current state of resources, the sequence of starting and stopping relative to other packages is of no importance. As a consequence of this invention, the following improvements over the prior art are described herein, namely, a) multiple packages using the same resources can now be run and monitored on the same machine; b) the monitor(s) may now be stopped, without impacting system service or the packages that they monitor and c) packages now share state information.

Discussion of Hardware and Software Implementation Options

The present invention, as would be known to one of ordinary skill in the art could be produced in hardware or software, or in a combination of hardware and software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD_ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. A method for recovery of system resources in a distributed computer network having a plurality of nodes, the method on a node comprising the step of:

commencing a monitoring process without impacting system services;

checking system resources with a monitoring subroutine wherein the monitoring subroutine is contained within a dedicated monitoring package; and detecting a system resource failure and performing the sub-steps of:
  restarting a system resource that has failed;
  locking a state table to maintain consistency of the state table;
  modifying a state of a resource to a last known state of the resource before or at a time of a failure;
  unlocking a state table to free it for modification by packages.

2. The method as defined in claim 1, further comprising the step of executing on the node multiple packages that use identical system resources.

3. The method as defined in claim 2, further comprising the step of sharing the multiple packages' state information.

4. The method as defined in claim 3, wherein the step of sharing the multiple packages' state information further comprises the sharing effected through the use of a shared state table.

5. The method as defined in claim 2, wherein the multiple packages that use identical system resources comprise network file system packages.

6. The method as defined in claim 2, wherein the multiple packages that use identical system resources comprise Sun Microsystems NFS network file system packages.

7. The method as defined in claim 2, wherein the multiple packages that use identical system resources provide smaller granularity for load balancing the nodes in the distributed computer network having a plurality of nodes.

8. The method as defined in claim 1, further comprising the step of stopping a monitoring subroutine contained within a dedicated monitoring package without impacting services.

9. The method as defined in claim 1, further comprising the step of migrating packages as a result of one item selected from the group of: an equipment failure, for load balancing and for planned maintenance.

10. The method as defined in claim 1, wherein the distributed computer network having a plurality of nodes comprises a Hewlett Packard MC/ServiceGuard cluster.

11. The method as defined in claim 1, wherein the distributed computer network having a plurality of nodes comprises a manufacturing plant network with a plurality of robot nodes and server nodes.

12. The method as defined in claim 1, wherein the distributed computer network having a plurality of nodes further comprises a disk farm accessible by the plurality of nodes.

13. A computer readable medium including programming instructions for recovery of system resources in a distributed computer network having a plurality of nodes, the instructions on the computer readable medium comprising:
  commencing a monitoring process without impacting system services;
  checking system resources with a monitoring subroutine wherein the monitoring subroutine is contained within a dedicated monitoring package; and detecting a system resource failure and
  performing the sub-steps of:
    restarting a system resource that has failed;
    locking a state table to maintain consistency of the state table;
    modifying a state of a resource to a last known state of the resource before or at a time of a failure;
    unlocking a state table to free it for modification by packages.

14. The computer readable medium as defined in claim 13, further comprising the instruction of executing on the node multiple packages that use identical system resources.

15. The computer readable medium as defined in claim 14, further comprising the instruction of sharing the multiple packages' state information.

16. The computer readable medium as defined in claim 15, wherein the instruction of sharing the multiple packages' state information further comprises the sharing effected through the use of a shared state table.

17. The computer readable medium as defined in claim 13, further comprising the instruction of stopping a monitoring subroutine contained within a dedicated monitoring package without impacting services.

18. The computer readable medium as defined in claims 13, further comprising the instruction of migrating packages as a result of one item selected from the group of: an equipment failure, for load balancing and for planned maintenance.

19. A monitoring unit for recovery of system resources in a distributed computer network having a plurality of nodes, the monitoring unit on a node comprising:
  a start device for commencing a monitoring process without impacting system services;
  a checking device for checking system resources with a monitoring subroutine wherein the monitoring subroutine is contained within a dedicated monitoring package; and the sub-devices of:
    a restart device for restarting a system resource that has failed;
    a hold device for locking a state table to maintain consistency of the state table;
    a change device for modifying a state of a resource to a last known state of the resource before or at a time of a failure; and
    a freeing device for unlocking a state table to free it for modification by packages.

* * * * *